United States Patent [19]

McKay et al.

[11] 4,290,919

[45] Sep. 22, 1981

[54] CRACKING CATALYSTS PASSIVATED BY TUNGSTEN

[75] Inventors: Dwight L. McKay; Brent J. Bertus; Harold W. Mark, all of Bartlesville, Okla.

[73] Assignee: Phillips Petroleum Co., Bartlesville, Okla.

[21] Appl. No.: 59,839

[22] Filed: Jul. 23, 1979

[51] Int. Cl.$^3$ .............................................. C10G 11/05
[52] U.S. Cl. ................................ 252/437; 208/52 CT; 208/114; 208/120; 252/411 R; 252/422; 252/423; 252/439; 252/455 Z
[58] Field of Search ................. 208/52 CT, 114, 119, 208/123, 120; 252/411 R, 437, 422, 439, 423, 455 Z

[56] References Cited

U.S. PATENT DOCUMENTS

| | | | |
|---|---|---|---|
| 2,396,641 | 3/1946 | Connally | 208/123 |
| 2,849,383 | 8/1958 | Hirschler et al. | 208/119 |
| 2,850,437 | 9/1958 | Kelso | 208/120 |
| 2,865,842 | 12/1958 | Hirschler et al. | 208/114 |
| 2,921,018 | 1/1960 | Helmers et al. | 208/114 |
| 3,340,322 | 9/1967 | Heckelsberg | 585/643 |
| 3,365,513 | 1/1968 | Heckelsberg | 585/643 |
| 3,711,422 | 1/1973 | Johnson et al. | 252/414 |
| 3,821,324 | 6/1974 | Bertus | 252/469 |
| 4,031,002 | 6/1977 | McKay | 252/437 X |
| 4,146,463 | 3/1979 | Radford et al. | 252/417 |
| 4,217,205 | 8/1980 | Marcilly et al. | 208/139 |

FOREIGN PATENT DOCUMENTS

| | | | |
|---|---|---|---|
| 556072 | 4/1958 | Canada | 208/114 |
| 515309 | 12/1939 | United Kingdom | 208/120 |

Primary Examiner—Delbert E. Gantz
Assistant Examiner—G. E. Schmitkons

[57] ABSTRACT

Metals such as nickel, vanadium and iron contaminating a cracking catalyst are passivated by contacting the cracking catalyst under elevated temperature conditions with tungsten and compounds of tungsten.

6 Claims, No Drawings

CRACKING CATALYSTS PASSIVATED BY TUNGSTEN

The present invention relates to the art of catalytic cracking of hydrocarbons. More specifically, the invention relates to the restoration of used cracking catalysts. In accordance with another aspect, this invention relates to modified cracking catalysts. Particularly, the invention relates to the passivation of contaminating metals on cracking catalysts.

BACKGROUND OF THE INVENTION

Hydrocarbon feedstock containing higher molecular weight hydrocarbons is cracked by contacting it under elevated temperatures with a cracking catalyst whereby light distillates such as gasoline are produced. However, the cracking catalyst gradually deteriorates during this process. One source for this deterioration is the deposition of contaminating metals such as nickel, vanadium and iron on the catalyst which increase the production of hydrogen and coke. At the same time the conversion of hydrocarbons into gasoline is reduced by these metals. It would, therefore, be desirable to have a modified cracking catalyst available, the modifying agent of which passivates those undesirable metal deposits on the cracking catalyst.

THE INVENTION

It is thus one object of this invention to provide a process for the passivation of contaminating metals deposited on cracking catalysts.

A further object of this invention is to provide a process for the restoration of a used cracking catalyst.

Still another object of this invention is to provide an improved catalytic cracking process.

A further object of this invention is to provide a modified cracking catalyst.

Still a further object of this invention is to provide a cracking process with high yield and selectivity for gasoline.

Yet another object of this invention is to provide passivating agents with specific efficiencies in one or more of the four features of reducing hydrogen production, reducing coke production, increasing gasoline production and increasing catalyst activity.

Further objects, embodiments, advantages, features and details of this invention will become apparent to those skilled in the art from the following detailed description of the invention and the appended claims.

In accordance with this invention, we have now found that metals selected from the group consisting of nickel, iron and vanadium deactivating a cracking catalyst can be passivated by contacting such catalysts with tungsten and compounds of tungsten. This modifying treatment increases catalyst activity, increases yield of gasoline, decreases production of coke, and/or decreases production of hydrogen in a cracking process as compared to the unmodified catalyst.

In accordance with another embodiment of this invention, a cracking catalyst is provided that has been prepared by contacting a clay based cracking catalyst with a compound of tungsten under elevated temperature conditions.

In accordance with a still further embodiment of this invention, the modified catalyst of this invention is one that has been prepared by contacting a clay based cracking catalyst with a tungsten passivating compound under reducing conditions. For the reducing conditions, it is particularly preferred to employ a fluidizing hydrogen-containing medium in contact with the clay based cracking catalyst and the passivating compound. To achieve the surprising advantages of this embodiment of the invention, it is preferred to have the reducing conditions prevailing when the clay based catalyst/passivating compound mixture is subjected to high temperatures for the first time. This initial treatment under elevated temperature conditions and in reducing surroundings generates a modification of the cracking catalyst that is not destroyed by subsequent regenerations or oxygen heat treatments. In this embodiment it is most preferred to contact the clay based cracking catalyst contaminated with metals such as nickel, vanadium and iron with the passivating compound under elevated temperatures and under reducing conditions.

The term "clay based catalyst" can be any of those cracking catalysts conventionally employed in the catalytic cracking of hydrocarbons boiling above 400° F. (204° C.) for the production of gasoline, motor fuel, blending components and light distillates; this cracking procedure is carried out in the absence of added hydrogen. The conventional cracking catalysts generally contain silica-alumina, and are frequently associated with zeolitic materials. These zeolitic materials can be naturally occurring or synthetic; usually they have been ion exchanged by conventional ion exchange methods to improve the activity of the catalysts. The zeolite-modified silica-alumina catalysts are particularly applicable in the present invention. Examples of catalysts that can be used in the process of this invention include hydrocarbon cracking catalysts obtained by admixing an inorganic oxide gelled with a zeolite, e.g., an aluminosilicate, but also materials in which aluminum is replaced by gallium and materials in which silicon is replaced by germanium, and zeolites in which by one or several operations of cation exchange the alkali ions are replaced by a rare earth metal cation and hydrogen ion, or ions capable of conversion to a hydrogen ion. Other cracking catalysts useful in the process of the present invention include crystalline aluminosilicate zeolites having the mordenite crystal structure. The cracking catalyst as a fresh catalytic material will generally be in particulate form having a particle size principally within the range of about 10 to about 200 microns.

The modified catalyst of this invention consists essentially of a conventional clay based cracking catalyst with a small amount of a passivating compound selected from tungsten and compounds of tungsten. The quantity of passivating compound is preferably such that about 0.05 to about 5 wt.% of tungsten is deposited on the catalyst, this percentage being based on the weight of the clay based cracking catalyst prior to treatment with the passivating compound.

The following tungsten compounds can be used to passivate metals-contaminated cracking catalysts: metallic salts of the $WO_4^{2-}$ anion, such as sodium tungstate, potassium tungstate, magnesium tungstate and the like; also the oxides such as tungsten dioxide and tungsten trioxide; also the sulfides such as tungsten disulfide and tungsten trisulfide; also salts of tetrathiotungstic acid such as potassium tetrathiotungstate and ammonium tetrathiotungstate; also acids and salts of the isopoly acids such as $WO_3 \cdot H_2O$, $[H_2W_{12}O_{40}]^{6-}$, $[H_2W_6O_{21}]^{5-}$, $[H_4W_3O_{13}]^{4-}$, and $[W_3O_{11}]^{4-}$ where ammonium, lithium, sodium, potassium, rubidium, and cesium are satisfactory as cations; also acids and salts of heteropoly acids such as $[X^{+n}W_{12}O_{40}]^{-(8-n)}$ where X can be phosphorus, arsenic, silicon, germanium, titanium, aluminum, chromium, gallium, tellurium, boron, or beryllium, and suitable cations are ammonium, elements of Group Ia of the periodic table, magnesium, and the like; also chemical complexes where the tungsten is bonded as in $[W(CN)_8]^{4-}$ and the like; also tungsten salts of dialkyl dithiophosphoric acid such as tungsten hexa(di-n-propylphosphorodithioate); also volatile compounds such as tungsten hexacarbonyl and tungsten hexafluoride; also powdered elemental tungsten. Less preferred, but acceptable, are the chlorides and oxychlorides such as tungsten hexachloride, tungsten pentachloride, tungsten tetrachloride, tungsten oxytetrachloride, tungsten oxydichloride and the like which readily hydrolyze with concomitant release of hydrogen chloride; also less preferred because of their refractory chemical nature, but acceptable, are the interstitial compounds tungsten boride, tungsten carbide, tungsten nitride, and tungsten silicide.

The catalyst in accordance with a further embodiment of this invention is obtained by mixing the clay based cracking catalyst with a finely divided passivating compound selected from tungsten and compounds of tungsten in powder form and subjecting this mixture to an elevated temperature. This temperature is generally in the range of about 800° F. (427° C.) to about 1500° F. (816° C.). The finely divided passivating compound powder preferably is of such a particle size as to pass through a Tyler Standard Screen of about 150 mesh or finer. The passivating compound particles can have a diameter of about 0.1 to 0.03 mm. Smaller particles can be used.

The mixing of the clay based cracking catalyst with the passivating compound can be achieved in any conventional manner such as rolling, shaking, stirring, etc. The passivating compound can be dissolved in a suitable solvent, aqueous or organic, and the resulting solution used to impregnate the cracking catalyst. The treated catalyst can then be dried to remove solvent. It is, however, presently preferred to mix the clay based catalyst and the passivating compound by adding the passivating agent either to a stream of catalyst in the cracking unit or preferably to the hydrocarbon feed stream entering the cracker.

In accordance with a further embodiment of this invention, there is provided a process for restoring cracking catalysts by passivating contaminating metals selected from the group consisting of nickel, vanadium and iron, which process comprises the step of contacting the contaminated clay based cracking catalyst with tungsten and compounds of tungsten under elevated temperature and reducing conditions. The preferred temperature, particle size, and concentration conditions disclosed above apply to this process as well. It is presently preferred to contact cracking catalyst on which a deactivating amount of the contaminating metals has been deposited with tungsten salts of dialkyl dithiophosphoric acid.

In accordance with still a further embodiment of this invention, there is provided a cracking process wherein hydrocarbon feedstock is contacted under cracking conditions with a modified clay based cracking catalyst which comprises a modifying amount of a passivating compound as defined above. For this embodiment, too, the preferred details concerning the modified cracking catalyst disclosed above apply also. Thus the preferred modified cracking catalyst is one that is obtained by mixing a clay based catalyst with a tungsten passivating compound, preferably with a tungsten salt of thiophosphoric acid, and subjecting the mixture to high temperature conditions. Most preferably the initial high temperature treatment of the cracking catalyst-passivating compound mixture is carried out under reducing conditions.

Advantageously and in accordance with still a further embodiment of this invention, the passivating compound is added to the feedstock entering the cracking zone in which it is contacted with cracking catalyst. By this procedure the contacting of the clay based cracking catalyst and the passivating compound and the initial treatment under elevated temperatures is done under reducing conditions prevailing in the catalytic cracker.

The cracking process of this invention is advantageously carried out in such a manner that the catalyst is continuously circulated from the cracking zone to a regeneration zone and back to the cracking zone. In the regeneration zone, the spent deactivated catalyst is regenerated by burning off coke from the catalyst with a free oxygen-containing gas.

The main component of the modified catalyst of this invention is a clay based catalyst which is commercially available.

The cracking catalysts modified by the passivating treatment of this invention are synthetic or natural silica-alumina compositions containing from 0 to about 10 wt. % of other metal oxides. The cracking catalysts that can be treated in accordance with this invention are commercially available. The amounts of nickel and vanadium in the unused catalyst should be very small, i.e., less than about 0.05 wt. % and the iron content should be less than about 0.5 wt. % to prevent excessive coke and hydrogen formation in the cracking process. The alumina content can vary from about 10–70 wt. %, and the silica content can vary from about 90–30 wt. % in general. In addition, the catalyst can contain rare earth metals, such as cerium and lanthanum, magnesia, zirconia, boria or thoria.

It is presently preferred to use active clay based catalysts, however. The catalysts are produced from such clays as bentonites, halloysites and kaolinites. Treatments such as acid washing followed by water washing can be employed to improve catalytic activity of the clay. After such treatment, the clay based catalyst can be pelletized and calcined to produce the final product.

The catalysts are often associated with zeolitic materials and these materials can be ion exchanged to provide metal ions which influence the activity of the catalyst. Rare earth metals such as lanthanum, cerium, praseodymium, neodymium and the like and combinations thereof can be used for this purpose.

The surface area of the clay based cracking catalyst generally is about 70–200 m²/g and the pore volume is around 0.3–0.4 ml/g.

The modifying or passivating compounds are commercially available from chemical supply firms. They can also be produced by known chemical reactions.

The feedstock utilized in the cracking process of this invention can be any feedstock usually employed for catalytic cracking. Generally speaking, feedstocks are petroleum or crude oil or products derived therefrom. The feedstocks generally are hydrocarbon mixtures having boiling points above the boiling point range of gasoline, i.e., boiling point ranges above about 400° F. (about 200° C.). These hydrocarbon mixtures include such fluids as gas oils, fuel oils, topped crudes and shale oils.

PROCESS CONDITIONS

Specific conditions in the cracking zone and the regeneration zone of a fluid catalytic cracker depend on the feedstock used, the condition of the catalyst, and the products sought. In general, conditions in the cracking zone include:

Temperature: 427°–649° C. (800°–1200° F.);
Contact time: 1–40 seconds;
Pressure: 10 kilopascals to 21 megapascals (0.1 to 205 atm.);
Catalyst: oil ratio: 3/1 to 30/1, by weight;
and conditions in the regenerator include:
Temperature: 538°–816° C. (1000°–1500° F.);
Contact time: 2–40 minutes;
Pressure: 10 kilopascals to 21 megapascals (0.1 to 205 atm.);
Air rate (at 316° C., 1 atm.): 100–250 ft.$^3$/lb. coke, or 6.2–15.6 m$^3$/kg. coke.

It is presumed that the feedstocks to the catalytic cracker, as described above, will contain a significant concentration of vanadium, iron, and/or nickel whose presence will affect adversely the catalyst's selectivity. Since these metals become concentrated in the least volatile fractions, cracking the heavy oils is probably the most important application for the passivated catalyst of this invention. The quantity of added tungsten required to passivate vanadium, iron, and nickel is related directly to their concentration in the feedstock. The following table relates the total concentration in the feedstock of these metals to the concentration of added tungsten on the cracking catalyst to passivate effectively these adventitious metals.

| Total V, Fe, Ni in Feedstock, ppm | Tungsten Added to Catalyst, Wt. %* |
|---|---|
| 40–100 | 0.05–0.8 |
| 100–200 | 0.1–1 |
| 200–300 | 0.15–1.5 |
| 300–800 | 0.2–2 |

*Based on weight of catalyst prior to addition of the tungsten compound. Concentrations are expressed as the element.

SPECIFIC EXAMPLE

This invention is illustrated by the following example.

The oil-soluble tungsten-containing compound tungsten hexa(di-n-propylphosphorodithioate) was synthesized as follows: To 7.83 gm. (0.0198 mole) of tungsten hexachloride dissolved in 50 ml of absolute ethanol was added, dropwise with stirring, a solution of 29.2 gm (0.119 moles) of potassium di-n-propylphosphorodithioate in about 125 ml of absolute ethanol. Stirring continued for an hour after the addition was completed. Precipitated potassium chloride was removed by filtration, and most of the ethanol was removed from the filtrate in a rotary evaporator. Cyclohexane was added to the red-brown semi-solid residue from the evaporation; it dissolved the product while precipitating the unconverted reactants. They were removed by filtration, and cyclohexane solvent was removed from the product in a rotary evaporator. Analysis of the product $C_{36}H_{84}O_{12}P_6S_{12}W$ gave the following results:

| | Calculated | Found |
|---|---|---|
| Carbon | 29.55 wt. % | 30.72 wt. % |
| Hydrogen | 5.79 | 6.48 |
| Phosphorus | 12.70 | 14.1 |
| Sulfur | 26.29 | 26.32 |
| Tungsten | 12.54 | 9.9* |

*This analysis was made about two months after sample was submitted, although sample was labeled "air sensitive."

A solution containing 1.595 gm of this compound in 49 ml of cyclohexane was mixed with 40 gm of used cracking catalyst to produce a material that, when dry, contained 0.5 weight percent of added tungsten. The used catalyst was a commercial product that had been used in a commerical fluid catalytic cracker until it had attained equilibrium composition with respect to metals accumulation (catalyst was being removed from the process at a constant rate). The catalyst, being a synthetic zeolite combined with amorphous silica/alumina (clay), was predominantly silica and alumina. Concentrations of other elements together with pertinent physical properties are shown in Table I.

TABLE I

| | |
|---|---|
| Surface area, m$^2$ gm$^{-1}$ | 74.3 |
| Pore volume, ml gm$^{-1}$ | 0.29 |
| Composition, wt. % | |
| Nickel | 0.38 |
| Vanadium | 0.60 |
| Iron | 0.90 |
| Cerium | 0.40 |
| Sodium | 0.39 |
| Carbon | 0.06 |

The catalyst that had been treated with tungsten hexa(di-n-propylphosphorodithioate) to contain 0.5 weight percent tungsten was prepared for testing by heating, while being fluidized with nitrogen, to 620° C. At that temperature the nitrogen fluidizing gas was replaced with hydrogen, and heating continued to 649° C. The reactor was flushed with nitrogen for five minutes and the catalyst fluidized for 15 minutes with air at that temperature.

The tungsten-treated catalyst and the untreated but used catalyst were evaluated in a fluidized bed reactor using Borger topped crude as feedstock to the cracking step. The cracking reaction was carried out at 510° C. and atmospheric pressure for 0.5 minutes, and the regeneration step was conducted at about 649° C. and atmospheric pressure for about 30 minutes with fluidizing air, the reactor being purged with nitrogen before and after each cracking step.

Properties of the Borger topped crude used in the cracking steps are summarized in Table II.

TABLE II

| API gravity at 15.6° C. | | 21.4° |
|---|---|---|
| Distillation (by ASTM D 1160–61) | | |
| IBP | 291° C. | |
| 10% | 428 | |
| 20% | 468 | |
| 30% | 498 | |
| 40% | 528 | |
| 50% | 555 | |
| Carbon residue, Ramsbottom | | 5.5 wt. % |
| Analysis for some elements | | |
| Sulfur | 1.2 wt. % | |
| Vanadium | 5.29 ppm | |
| Iron | 29 ppm | |
| Nickel | 5.24 ppm | |
| Pourpoint (by ASTM D 97–66) | | 17° C. |
| Kinematic viscosity (by ASTM D 445–65) | | |

TABLE II-continued

| at 82.2° C. | 56.1 centistokes |
| at 98.9° C. | 32.1 centistokes |

Results of tests with these two catalysts, including triplicate tests with the tungsten-treated catalyst, are summarized in Table III.

TABLE III

| Catalyst | Catalyst:oil Weight Ratio | Conversion, Vol. % of Feed | Yields | | |
|---|---|---|---|---|---|
| | | | Coke, Wt. % of Feed | SCF $H_2$/bbl. Feed Conv. | Gasoline, Vol. % of Feed |
| Used | 7.7 | 74.9 | 17.6 | 895 | 54.6 |
| Used + 0.5% W (1) | 7.4 | 75.2 | 13.9 | 716 | 56.8 |
| Used + 0.5% W (2) | 7.4 | 74.9 | 13.8 | 675 | 52.3 |
| Used + 0.5% W (3) | 7.4 | 78.4 | 14.5 | 710 | 59.1 |

When compared with the untreated catalyst, the average of three tests made with the tungsten-treated catalyst showed 2.7 percent increase in yield of gasoline, 22 percent reduction in hydrogen, and 20% reduction in coke, with a slight increase in conversion of feed. It is believed that the phosphorus in the treating additive that was evaluated contributed significantly to the passivation of the metals-contaminated catalyst, but the total effect required additional passivation by the added tungsten.

We claim:

1. A modified cracking catalyst obtained by contacting a zeolite-modified silica-alumina cracking catalyst on which a deactivating amount of at least one metal selected from the group consisting of nickel, iron, and vanadium has been deposited and at least one passivating material selected from tungsten and compounds of tungsten under elevated temperature conditions in an amount such as to add about 0.05 to 2 weight percent tungsten based on the weight of the untreated catalyst.

2. A catalyst in accordance with claim 1 obtained by contacting the cracking catalyst with the passivating material at temperatures in the range of about 800° F. (427° C.) to about 1500° F. (816° C.) and under reducing conditions.

3. A catalyst in accordance with claim 1 obtained by contacting the cracking catalyst with tungsten at temperatures in the range of about 800° F. (427° C.) to about 1500° F. (816° C.) and under reducing conditions.

4. A catalyst in accordance with claim 1 obtained by contacting said cracking catalyst with a tungsten salt of thiophosphoric acid.

5. A catalyst according to claim 4 wherein said tungsten salt is tungsten hexa(di-n-propylphosphorodithioate).

6. A modified cracking catalyst obtained by contacting a zeolite-modified silica-alumina cracking catalyst and at least one passivating compound containing tungsten and phosphorus, under elevated temperature conditions.

* * * * *